C. E. S. BURCH.
TRACTION DEVICE.
APPLICATION FILED JULY 16, 1918.
1,300,814.
Patented Apr. 15, 1919.
3 SHEETS—SHEET 1.
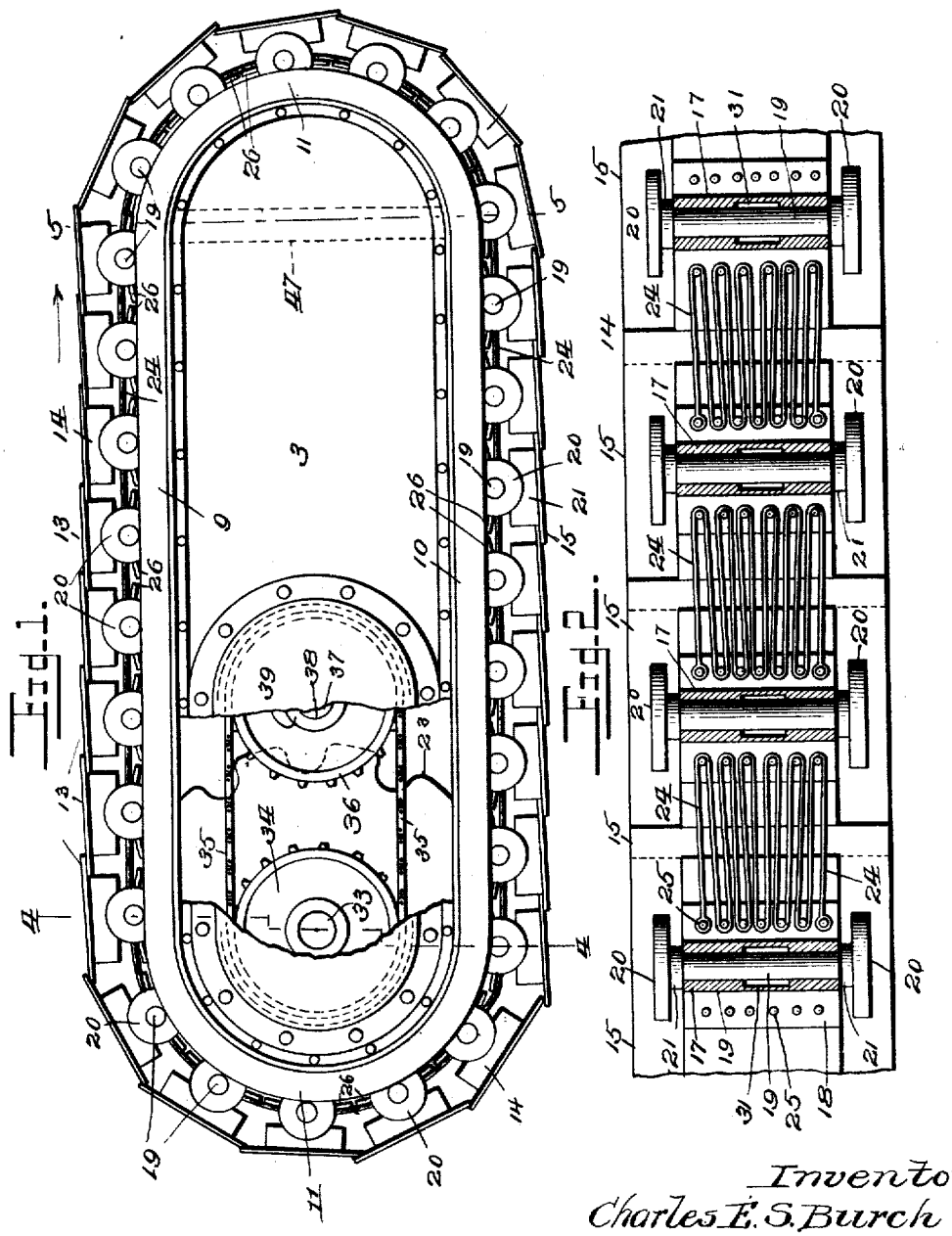
Inventor
Charles E. S. Burch
By L. L. Hines,
Atty.

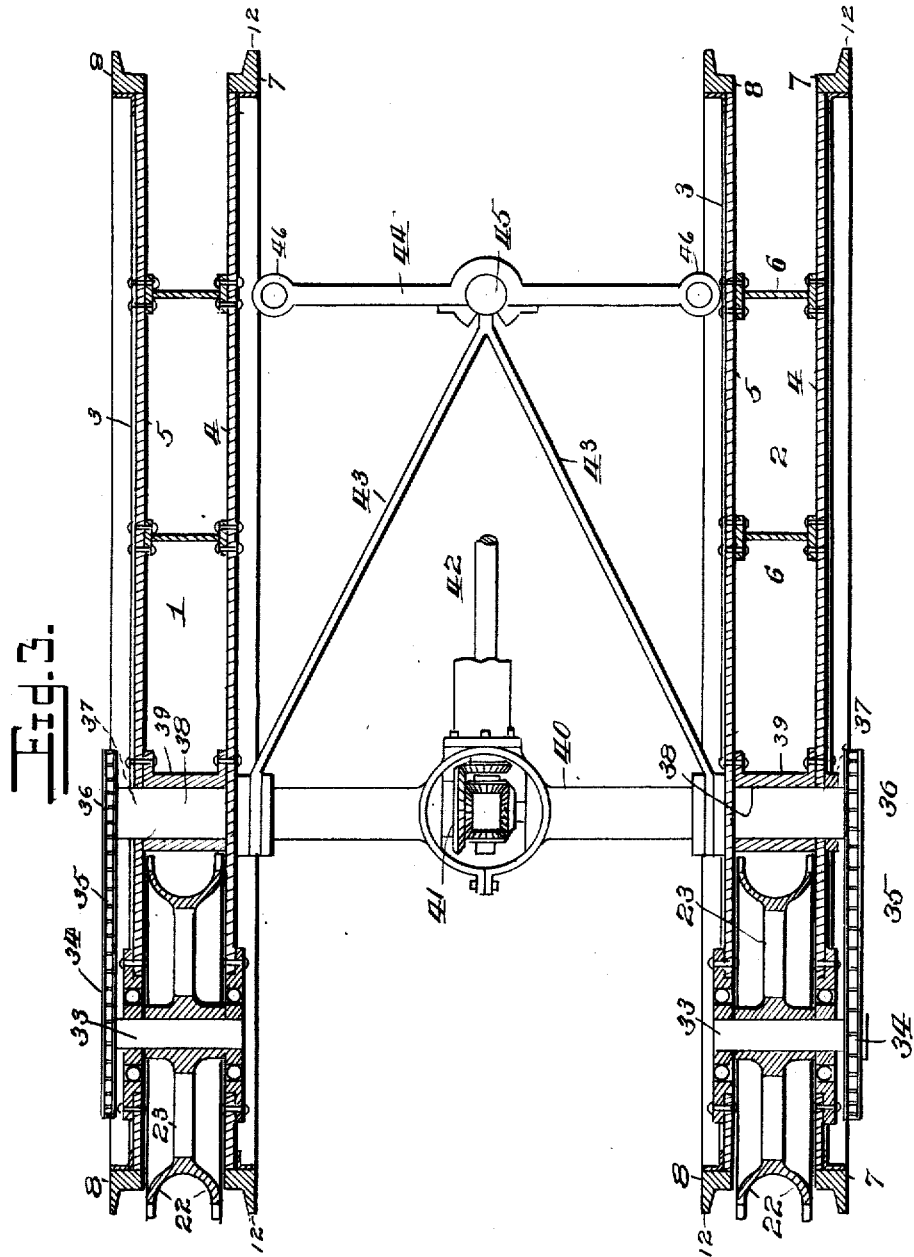

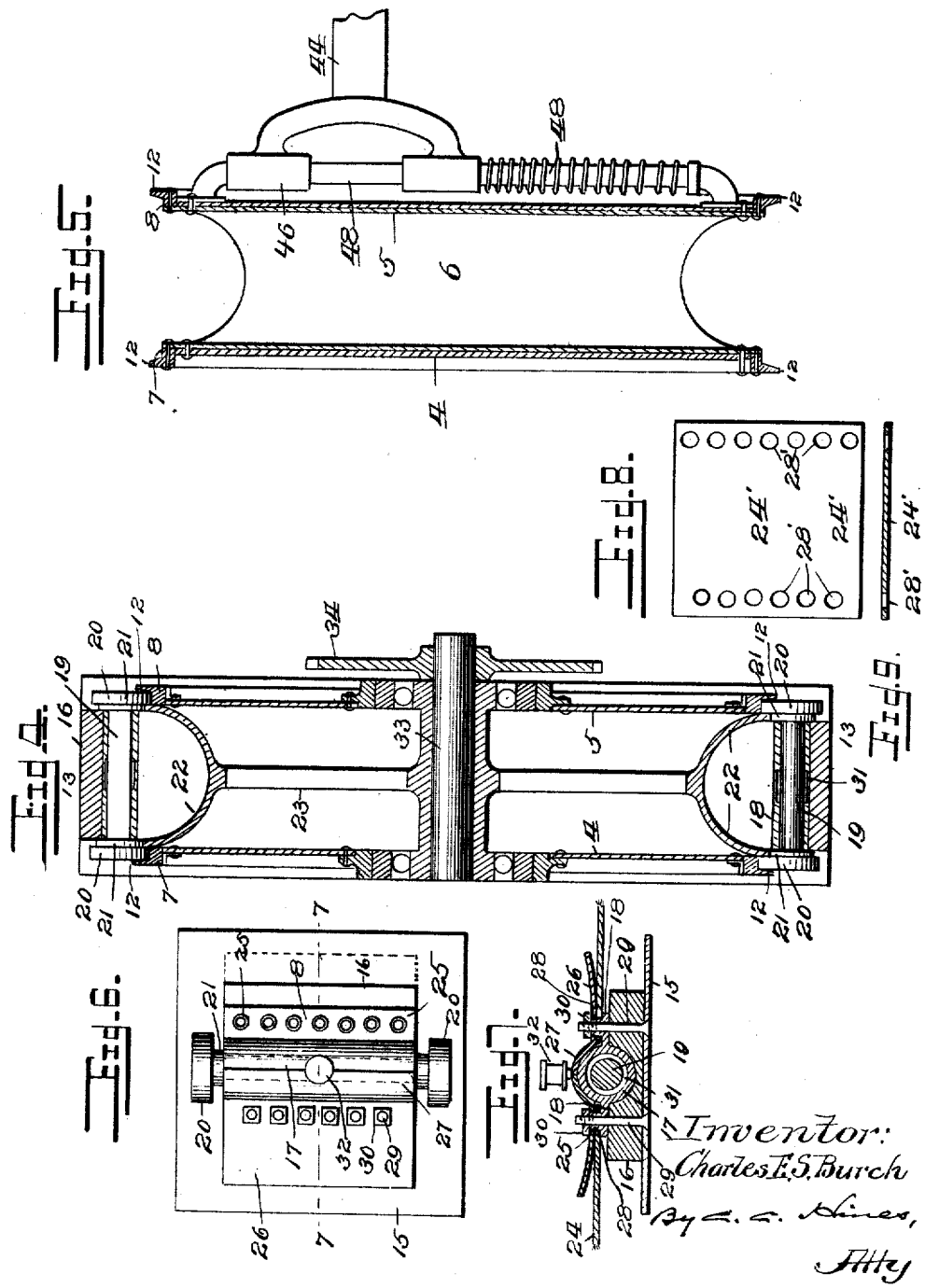

UNITED STATES PATENT OFFICE.

CHARLES E. S. BURCH, OF SAN JOSE, CALIFORNIA, ASSIGNOR OF ONE-HALF TO HART S. DE PUY, OF SAN DIEGO, CALIFORNIA.

TRACTION DEVICE.

1,300,814.         Specification of Letters Patent.         Patented Apr. 15, 1919.

Application filed July 16, 1918. Serial No. 245,204.

*To all whom it may concern:*

Be it known that I, CHARLES E. S. BURCH, a citizen of the United States, residing at San Jose, in the county of Santa Clara and State of California, have invented new and useful Improvements in Traction Devices, of which the following is a specification.

This invention relates to traction devices, and particularly to improvements in traction devices of the caterpillar type, embodying an endless traction or track-laying belt composed of a continuous series of jointed shoes or tread members.

In all prior constructions of traction belts with which I am familiar, the shoes or tread members are united by hinge-joints, formed of knuckles and hinge-pins, pivotally coupling the shoes or tread members in such a manner as to permit them to properly travel around the driving and guide sprockets and to have flexing movements in a vertical plane to conform to varying irregularities in the surface of the ground. Such traction belts have a large number of these hinge-joints, which are subjected to considerable wear and tear on account of their flexing movements, resulting, in a comparatively short time, in a loosening of the joints and lengthening of the belt so that it will not properly engage the sprocket wheels. Furthermore, as the traction rails are carried by the belt and are a part thereof, and, like the belt, hinge-jointed, the said rails cannot maintain a smooth, rigid, running surface to support the load imposed by the traction wheels, but will be depressed or elevated in accordance with the conformation, softness, hardness or degrees of irregularities of the road bed over which the trackway may be laid. The constant flexing of the hinge-joints due to these causes not only limits the speed of travel, but also causes excess wear and tear on the hinge-joints. I am aware that some forms of caterpillar tractors now in use embody two tracks having contact with interposed antifriction balls, wheels or like rolling elements, i. e., a smooth inner track, and a jointed outer track, the said outer track being a component part of the belt and, like the belt, composed of jointed elements, but this type of construction is also open to the objections above mentioned and, in addition, is subject to increased wear and tear owing to the travel of the joints of the outer track over the friction wheels or rollers. The hinge-joints are also subjected to increased friction and wear due to particles of sand, dust and mud which are deposited upon the contacting surfaces of the joints in the operation of the belt. Due to these facts, and to the further fact that it is difficult to lubricate the joints, belts of the character described are comparatively short lived and expensive in service and difficult to maintain in proper working order and repair.

Another objection to all prior caterpillar traction belts with which I am familiar is due to the fact that these belts are, in whole or in part, required to be self-supporting, or are devoid of proper backing to resist the imposed strains throughout their orbits of movement, and in the movements of the shoes or tread members in a curved path at the ends of the belt the shoes are required to assume objectionable angular positions, resulting in increased wear and tear upon the joint surfaces, as well as in the transmission of strains materially increasing the resistance to motion of the belt and driving load upon the driving mechanism. In order to provide a belt of sufficient strength and wearing durability to meet the pressures and strains falling thereon as a result of these objections, it is necessary to make the belt of comparatively great weight, increasing the cost of production and amount of power necessary to drive the tractor.

One object of my invention is to provide a traction belt which obviates the necessity of employing hinge-joints, and which embodies in lieu thereof the use of individual flexible connectors between and arranged in alternation with the shoes or tread members, which connections have a wide amplitude of flexibility and thus materially reduce the amount of wear and tear upon the belt and prolong its period of usefulness.

A further object of the invention is to provide a continuous trackway for coöperation with an endless traction belt of the character described and which guides and sustains the belt throughout its entire orbit of movement, thus further reducing wear and tear upon the belt and the pressures and strains falling upon the belt and the driving mechanism.

A still further object is to provide flexible connectors which do not require lubrication and in which supporting wheels are mounted upon the shoes or tread members at points between and equidistantly from adjacent connectors for contact with the continuous track, together with simple and efficient means for lubricating the journals thereof, whereby the shoes are continuously supported and ease of motion of the belt insured.

A still further object of the invention is to provide novel means upon the belt for guiding and staying the individual flexible connectors and shoes in their travel around the curved ends of the continuous trackway, thereby insuring ease of motion and a reduction of resistance in the travel of the belt at these points, as well as decreased wear and tear upon the articulating connectors.

A still further object of the invention is to provide a traction belt which is simple of construction, composed of a minimum number of parts, which is light in weight and therefore adapted to be driven by considerably less power than belts of ordinary construction, and which may be readily and conveniently repaired.

With these and other objects in view, the invention consists of the features of construction, combination and arrangement of parts, hereinafter fully described and claimed, reference being had to the accompanying drawings, in which:—

Figure 1 is a side elevation, with parts broken away, of an endless track and endless traction-belt constructed in accordance with my invention.

Fig. 2 is a horizontal longitudinal section through a portion of the endless traction-belt on an enlarged scale.

Fig. 3 is a sectional plan view of a pair of traction devices as coupled for use on a vehicle and connected with the driving elements of a drive mechanism.

Fig. 4 is an enlarged vertical transverse section on the line 4—4 of Fig. 1.

Fig. 5 is an enlarged vertical transverse section on the line 5—5 of Fig 1.

Fig. 6 is an inner face view of one of the tread-shoes or members.

Fig. 7 is a section on the line 7—7 of Fig. 6.

Fig. 8 is a plan view of a modified form of flexible connector.

Fig. 9 is a sectional view thereof.

In the drawings I have shown a pair of traction devices 1 and 2, of similar construction, which are arranged in parallel relation in the usual way for driving action on opposite sides of a vehicle. Each of these traction devices comprises a track frame 3, preferably made of a pair of spaced plates 4 and 5 connected and maintained in spaced relation by braces 6, of I-beam or other suitable form, bolted, riveted or otherwise suitably secured thereto.

Each track frame 3 carries a continuous track, formed of a pair of spaced track rails 7 and 8, mounted upon the respective plates 4 and 5, the trackway being of substantially elliptical form as shown, and each track rail having upper and lower parallel or substantially parallel horizontal portions 9 and 10 and curved end portions 11 connecting the similar opposite ends thereof. Suitable guards 12 are provided along the outer edges of the track rails 7 and 8 to hold the wheels or rollers of the endless traction-belt against lateral displacement, as hereinafter described, and thereby obviate any liability of the belt becoming displaced from its operative position or connection with the track or driving sprocket.

Mounted for travel upon and about the endless track is a traction belt 13 composed of a continuous series of connected shoes or tread sections 14. These shoes or tread sections may be of any suitable general form and construction, but, as shown, each consists of a tread plate 15 arranged to bear against a carrier block 16 which is recessed to receive the bearing sleeve 17 of a combined bearing and coupling plate 18. The bearing sleeve 17 extends transversely from side to side of the plate 18 and receives a wheel bearing journal or spindle 19 carrying at its ends fixed wheels or rollers 20 to travel upon the track rails 7 and 8, and also carrying at its ends loosely mounted sleeves or rollers 21 to engage the teeth of the spaced rims 22 of a sprocket drive gear or wheel 23.

The combined coupling and bearing plates 18 of the respective shoes are suitably spaced apart around the belt and the shoes are articulatively connected by flexible connectors 24. Each of these connectors, as clearly shown in Fig. 2, consists of a (preferably steel) cable or rope united to adjacent rows of tubular bosses or studs 25 arranged upon the plates 18 in transverse rows on opposite sides of the bearing sleeve 17, the cable being fixed to one of the end studs of one of the plates 18 and thence looped back and forth around the studs of the other plate 18 and the intermediate studs of the plate first named and finally connected at its opposite end with the other end stud of the plate first named. The looped ends of each connector cable are held in position upon the studs by a curved clamping and shield plate 26, which is provided with a semi-circular central portion 27 receiving and engaging the inner half of the bearing sleeve 17, and with curved end portions provided with rows of openings 28 through which the studs extend, and by which the plate 26 is fitted in position upon said studs to hold the looped ends of the cables clamped against the plate 18. Bolts 29 pass through the tread plate 15, carrier block 16 and the studs and holes in the plate 26 and are provided with nuts 30, whereby all the parts named are united to form a complete tread unit.

It will be understood from the foregoing description that each tread shoe or member is provided with a suitable tread surface 15 and with a shaft or spindle 19 carrying combined anti-friction and supporting wheels or rollers 20 which travel around the track rails 7 and 8 and thereby support and sustain the belt at all points throughout its orbit of movement, and that said shafts or spindles also carry loose rollers 21 forming sprocket members for engagement with the teeth of the sprocket driving wheel 23 whereby driving motion will be imparted to the belt. It will, of course, be understood that the tread plates 15 may be of any suitable form or construction to secure the desired gripping action upon the ground as circumstance may require in the particular use to which the tractor is to be put. The sleeves 17 are suitably cored to form lubrication receiving chambers 31 supplied from lubrication feed cups 32 or the like, the motion of the spindle or axle 19 depositing the lubricant to the bearing surfaces and causing the same to flow toward the ends of the bearing at opposite sides of the belt, thereby tending to wash out any particles of dust or dirt which may creep in between the bearing surfaces and to reduce to a large extent the wear upon the bearing parts due to the access of foreign substances.

In the operation of the tractor belt, it will be understood that the lower or working stretch of the belt will travel along and in contact with the lower horizontal track surfaces 10, while the upper, return or inactive stretch of the belt will travel along the upper horizontal portion 9 of the trackway, and the intermediate portions of the belt will travel around the curved portions 11 of the trackway, the construction thus being such that the wheels or rollers 20 will travel upon a continuous rigid backing surface giving a smooth running channel for the belt at all points, whereby ease of motion of the belt is insured. It will also be seen that the upper portion 9 of the trackway will support the weight of the upper stretch of the belt, thus preventing such weight from being thrown in whole or part upon the drive sprocket and increasing the tension and resistance of the belt, or, in other words, objectionably increasing the driving load upon the driving power. It will furthermore be seen that the use of the flexible connectors 24 allows the shoes or tread members to have a very wide amplitude and ease of articulating motion, while eliminating the use of hinge-joints and other hinging connections which, through their pivotal motions, increases the resistance of movement of the belt and are subject to wear and tear whereby the life period of the belt is reduced. As these flexible connectors are subjected to a major extent only to pulling strains due to the traction of the belt, and are relieved of the frictions and strains resulting from the direct movements of parts upon one another, as in hinge-joints, it will be evident that the wear and tear upon the belt is not only decreased, but the belt adapted to move with less resistance and greater speed and flexibility.

An important feature incident to my invention resides in the fact that the flxible connectors 24 also permit those shoes or tread members traveling in an arc around the curved ends 11 of the trackway to accommodate themselves to the curvature of said trackway, without liability of assuming objectionable angular or other resistance-creating positions throwing added strains upon the belt. The connectors being comparatively long and freely flexible independently of one another, permit the roller bearings of each tread shoe or member to travel smoothly around the curved ends of the trackway without binding action upon one another. To further decrease the resistance and secure increased ease of motion, however, the curved guide and cable plates 26 are provided. It will be observed that the end portions of these plates are so curved that the plates 26 of all the wheeled carriages of the shoes or tread members passing around a curved end 11 of the trackway will extend on a comparatively wide arc of curvature concentric with the curved end of the trackway and form a backing or abutment against which the comparatively long correspondingly curved connectors of the shoes lie, thus causing the connectors and shoes to travel in a perfect arc corresponding to the track portion around which they travel. As a result no added resistance to motion will be imposed upon the portions of the belt passing around the curved ends of the trackway, and a uniform traction pull upon the belt at all points will thereby be maintained, further decreasing wear and tear upon the belt. Ease of travel of the belt being insured through the construction of the trackway and connectors described, it will be evident that the use of an inner track forming a component part of the belt may be dispensed with and that consequently a belt considerably lighter in weight than those in common use, and capable of being driven by less power, may be produced and driven at greater speed without the loss of power commonly lost in driving a belt of cumbersome type and heavy weight.

Another and material advantage resulting from my improved construction of belt resides in the fact that in the event of the breakage of any tread member or individual connector, it is a very simple matter to repair or replace any member of the belt group, as the same is readily separable from its companion members, whereas in the ordinary construction of belts with hinged parts it is frequently difficult or impossible to repair or replace a broken or worn out part, particularly if the break occurs while the machine is out upon the road or in the field or at a point remote from the factory or a repair shop.

I am aware of the fact that it has heretofore been suggested to use flexible connectors between the tread members in the form of bands or cables, but in all these prior structures such bands or cables extend continuously around the belt and, in fact, form the endless belt to which the tread members are attached. The objection to such a construction is that no one portion of the flexible belt between adjacent tread members can bend or flex without influencing adjacent portions of the belt and thereby causing unnecessary flexing motions resulting in increased wear and tear upon the traction device. By the use of independent flexible connectors I avoid this objection, since each connector between adjacent tread members may freely bend or flex without to any material extent influencing adjacent connectors. Continuous connectors are also liable to stretch, and to unequal extents, making it difficult to keep the belt taut and the tread members in proper alinement, whereas in the use of individual connectors these may be of a type and arranged to resist and reduce stretching to the minimum, to be individually tightened when required to an exact degree, and to resist movement of the tread members out of alinement. In case of a break of continuous connectors repair is practically impossible without removing the belt and taking it apart, whereas in the event of the breakage of an individual connector, as in my construction, such connector may be readily repaired or replaced without removing the belt or disturbing any of the other parts thereof.

Instead of employing an individual flexible connector in the form of a cable or rope, I may under some conditions employ a flexible connector of the type shown in Fig. 8, the same consisting of a comparatively thin flexible steel plate 24' having rows of openings 28' for engagement with the studs 25 of the plates 18, whereby such flexible connector plates may be coupled to adjacent tread members. These plates are also of a form to assume a curvature corresponding to the curvature of the coupling and shield plates in passing around the curved ends of the track and to be applied and removed with facility.

The means shown for driving the endless belt 13 comprises the sprocket wheel 23 the hub of which is mounted upon an axle 33 on which is a sprocket wheel 34 driven by a chain 35 upon a drive sprocket 36. The sprocket 36 is mounted upon a shaft 37 journaled in a plate-bearing 38, extending through a bearing tube or hub 39 connected with the plates 4 and 5 of the track frame. The shafts 37 of the driving wheels of the two traction belts project across between the belts and extend through suitable housings 40 and may be associated with a suitable type of differential gearing 41 receiving motion from a transmission shaft 42, which may be driven in the usual manner from the transmission gearing of a tractor motor drive mechanism. The housing sleeves 40 may be connected by radius rods 43 with a cross bar or beam 44 having a universal joint connection 45 therewith, the body of the vehicle being mounted in any suitable manner upon a main frame or chassis supported by the running gear thus described. The construction in practice is adapted to permit the track frames and traction-belts to have independent vertical pivotal motion on the axles 37. The bar 44, in addition to its universal joint connection at 45 with the radius rods 43, is flexibly connected with the forward ends of the track frames in any suitable manner to permit vertical motion of such frames, such connection in the present instance comprising sleeves 46 on the ends of said bar slidably engaging bracket rods 48. Any suitable mode of relatively mounting the traction-belts and tracks and the body may, however, in practice be employed.

It will be evident from the foregoing description that by reason of the reduced wear and tear upon the belt, slackness of the belt is not liable to occur, except in such degree as may be due to any slight lengthening of the flexible connector cables which may occur from traction strains. This is not liable, however, to occur in any sufficient degree to cause material slackness of the belt, such as would prevent its proper running contact with the track and engagement with the sprocket drive wheel. Suitable provision may, however, be made for adjusting the bearings of the shaft 33 to take up any slight slack which may occur in the belt, as will be readily understood.

Having thus fully described my invention, I claim:

1. A traction belt comprising alternately arranged tread members and individual flexible connectors between said tread members.

2. A traction belt comprising alternately arranged tread members and individual, separable flexible connectors between adjacent tread members.

3. A traction belt comprising alternately arranged tread members and individual resilient flexible connectors between adjacent tread members.

4. A traction belt comprising tread members, and a separate resilient flexible connector between each pair of said tread members.

5. A traction belt comprising spaced tread members, and comparatively long flexible individual connectors between said tread members adapted for individual curvilinear flexion in a plane perpendicular to the plane of said tread members.

6. A traction belt comprising an endless series of tread members, each pivoted to tilt upon a central transverse axis, and an independent flexible connector uniting each pair of adjacent tread members on adjacent sides of the axes thereof.

7. A traction belt comprising alternately arranged tread members and individual flexible connectors between adjacent tread members, said connectors being detachably connected with the tread members.

8. A traction belt comprising alternately arranged tread members and individual flexible connectors between said tread members, each connector consisting of a unit uniting adjacent tread members.

9. A traction belt comprising an endless series of tread members, each consisting of a carrier, transverse spindles on which the carriers are centrally mounted to tilt, said spindles having rollers to travel upon a trackway, tread surfaces upon the outer faces of the carriers, a flexible connector between each pair of carriers, and curved members upon the carriers adapted to form curved supports for the connectors to adapt said connectors to assume a curve corresponding to a curved portion of the trackway.

10. A traction belt comprising tread members, individual flexible connectors between the tread members, and supporting and guiding elements detachably mounted upon the tread members and securing the connectors thereto, said elements being operative to adapt the connectors to assume a curve corresponding to a definite curve in the orbit of travel of the belt.

11. A traction belt comprising alternately arranged tread members and individual flexible connectors between adjacent tread members, each of said connectors comprising a unit secured transversely along the adjacent edges of the tread members.

12. A traction device comprising a track having curved portions, and a belt composed of tread members, wheeled carriages pivotally supporting the tread members and running upon said track, individual resilient flexible connections between the carriages adapted for curvilinear flexion in a plane perpendicular to the plane of travel of the tread members, and curved shields upon the carriages arranged to form curved abutments for maintaining a prescribed curvature of said connections in their travel around the curved portions of the trackway.

13. A traction belt comprising alternately arranged tread members and individual flexible connectors between said tread members, each tread member including a carrier, the carriers of the tread members being spaced apart and free from pivotal or lapping engagements, the adjacent edges of adjoining carriers being independently united by the individual connectors.

14. A traction device comprising an endless trackway, and a traction belt composed of tread elements, wheeled carriages pivotally supporting the tread elements and having bearing contact with said trackway, and independent flexible connectors between the carriages.

15. A traction device comprising an endless trackway, and a belt composed of tread members, carriages pivotally supporting the tread members and having wheels to travel upon said trackway, individual flexible connectors between the carriages capable of bending longitudinally in curved lines upon themselves in a plane perpendicular to the plane of travel of the tread members, and curved shields demountably supported by the carriages and clamping the connectors thereto, said shields being operative to form curved abutment surfaces for the connectors in the travel of the latter around curved portions of the trackway.

16. A traction device comprising alternately arranged tread members and individual resilent cable connectors between adjacent tread members.

17. A traction device comprising an endless trackway, and a traction belt comprising a series of tread members, transverse spindles on which the tread members are centrally and tiltably mounted, said spindles being provided with wheels or rollers to travel upon the trackway, and individual flexible connections between the tread members connected thereto between their free adjacent edges and the spindles and capable of bending longitudinally upon themselves in a plane perpendicular to the plane of travel of the tread members.

18. A traction device comprising an endless trackway, and a traction belt composed of tread members having wheels or rollers to traverse said trackway, individual flexible connectors between the tread members, and demountable curved abutments on said tread members adapted to lie in bearing contact with the flexible connectors and guide the same in a path conforming to a curved portion of the trackway.

19. A traction device comprising alternately arranged tread members and looped individual flexible connectors between adjacent tread members.

20. A traction device comprising an endless trackway having spaced track rails, and a belt movable in the space between the track rails and composed of tread members, shafts on which the tread members are centrally mounted for tilting motion, said shafts having wheels or rollers to travel upon the rails of the trackway, individual flexible connectors between the tread members, and curved shields formed independently of the carriages and demountably secured thereto, said shields being arranged to form curved bearing contacts for said connectors.

21. A traction device comprising alternately arranged tread members and individual flexible connectors between adjacent tread members, each connector comprising a looped element threaded back and forth between and connected at points with the tread members transversely thereof.

22. A traction device embodying track rails, a drive gearing including a drive sprocket, a belt consisting of flexibly connected tread members, transverse spindles on which the tread members are pivotally mounted, wheels upon the ends of the spindles at opposite sides of the tread members, said wheels being arranged to run upon said track rails, and sprocket rollers loosely mounted upon the spindles between said wheels and the tread members, said rollers being adapted for driving engagement with the drive sprocket.

23. A traction device comprising alternately arranged tread members having projecting studs upon their adjacent edges, and individual flexible connectors between said tread members engaging said studs.

24. A traction device comprising alternately arranged tread members provided with transverse rows of studs upon their adjacent edges and individual flexible connectors uniting adjacent tread members and in detachable engagement with said studs.

25. A traction device comprising alternately arranged tread members provided upon their adjacent edges with transverse rows of studs, and individual flexible connectors between adjacent tread members, each consisting of a looped element engaging adjacent series of studs.

26. A traction device comprising a trackway having a curved portion, and a traction belt embodying alternately arranged tread members and individual flexible connectors uniting adjacent tread members, and retaining plates holding said connectors in engagement with the tread members, said retaining plates being of a form to provide curved backing surfaces to support the flexible connectors in curved form concentric with the curved portion of a trackway traversed by the belt.

27. A traction belt comprising alternately arranged tread members and individual flexible connectors between adjacent tread members, each of said tread members having transverse rows of studs, the connectors being engaged with the rows of studs of adjacent tread members, and curved retaining and backing plates for said connectors engaging said studs and holding the connectors in engagement therewith.

28. A traction belt comprising a series of tread members, each centrally pivoted to tilt upon a transverse axis, and individual flexible connectors between the opposed edges of adjoining tread members, said connectors being coupled to the respective tread members equidistantly on opposite sides of the axis thereof.

29. A traction belt comprising tread members, each including a carrier pivoted to tilt centrally upon a transverse axis, the adjacent edges of the carriers of the tread members being spaced apart and free from connection or lapping engagement, and individual flexible connectors between adjacent edges of adjoining tread members, said connectors being coupled to the tread members equidistantly on opposite sides of the axes thereof and between the axes and the front and rear edges of the connectors.

In testimony whereof I affix my signature.

CHARLES E. S. BURCH.